(12) United States Patent
Gourgue et al.

(10) Patent No.: US 6,868,077 B1
(45) Date of Patent: Mar. 15, 2005

(54) DEVICE ENABLING DIFFERENT SPREADING FACTORS WHILE PRESERVING A COMMON RAMBLING CODE, IN PARTICULAR FOR TRANSMISSION IN A CODE DIVISION MULTIPLE ACCESS CELLULAR MOBILE RADIO SYSTEM

(75) Inventors: Frédéric Gourgue, Paris (FR); Fabienne Roosen, Bourg la Reine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/291,748

(22) Filed: Apr. 14, 1999

(30) Foreign Application Priority Data

Aug. 12, 1998 (FR) .......................................... 98 10345

(51) Int. Cl.[7] .............................................. H04B 7/216
(52) U.S. Cl. ........................ 370/342; 370/208; 375/141
(58) Field of Search ................................ 370/335, 342, 370/208, 441, 209, 320, 479; 380/270; 375/206, 141, 149, 140

(56) References Cited

U.S. PATENT DOCUMENTS

| | | | | |
|---|---|---|---|---|
| 5,077,753 A | * | 12/1991 | Grau et al. ................. | 375/141 |
| 5,550,809 A | * | 8/1996 | Bottomley et al. ......... | 370/342 |
| 5,771,288 A | * | 6/1998 | Dent et al. ................. | 380/270 |
| 6,009,091 A | * | 12/1999 | Stewart et al. ............. | 370/342 |
| 6,185,199 B1 | * | 2/2001 | Zehavi ....................... | 370/335 |
| 6,222,875 B1 | * | 4/2001 | Dahlman et al. ........... | 375/130 |
| 6,393,047 B1 | * | 5/2002 | Popovic ..................... | 375/140 |
| 6,424,618 B1 | * | 7/2002 | Uesugi et al. .............. | 370/208 |
| 6,504,830 B1 | * | 1/2003 | Ostberg et al. ............. | 370/342 |
| 6,643,275 B1 | * | 11/2003 | Gustafsson et al. ........ | 370/238 |

FOREIGN PATENT DOCUMENTS

| | | |
|---|---|---|
| JP | 10164009 | 6/1998 |
| WO | WO 95/03652 A | 2/1995 |
| WO | WO 96/05668 A1 | 2/1996 |
| WO | WO 9605668 A1 * | 2/1996 ............ H04J/13/00 |

OTHER PUBLICATIONS

Specifications of Air–Interface for 3G Mobile System, Association of Radio Industries and Businesses (ARIB), vol. 3, version 0.5, issued Dec. 18, 1997 (revision—Jul. 21, 1998), pp. 35–45.

* cited by examiner

*Primary Examiner*—John Pezzlo
(74) *Attorney, Agent, or Firm*—Sughrue Mion, PLLC

(57) ABSTRACT

A device which enables different spreading factors while preserving a comnmon scrambling code, in particular for transmission in a code division multiple access cellular mobile radio system. The device including a grouper for grouping the various data symbols of a kth incoming sequence (k=1, . . . , K) into different blocks of $Q_{MAX}/Q_K$ symbols, and a spreader for spreading K incoming sequences with K respective spreading codes of respective length $Q_k$ (k=1, . . . , K) which is a sub-multiple of a maximum length $Q_{MAX}$, wherein the spreader spreads the blocks from the kth incoming sequence (k=1, . . . , K) with the corresponding code of length $Q_k$ to obtain a spread sequence including different spread blocks of length $Q_{MAX}$. The device further includes a scrambler for scrambling each of the K spread sequences obtained in this way using a scrambling code of length $Q_{MAX}$.

10 Claims, 4 Drawing Sheets

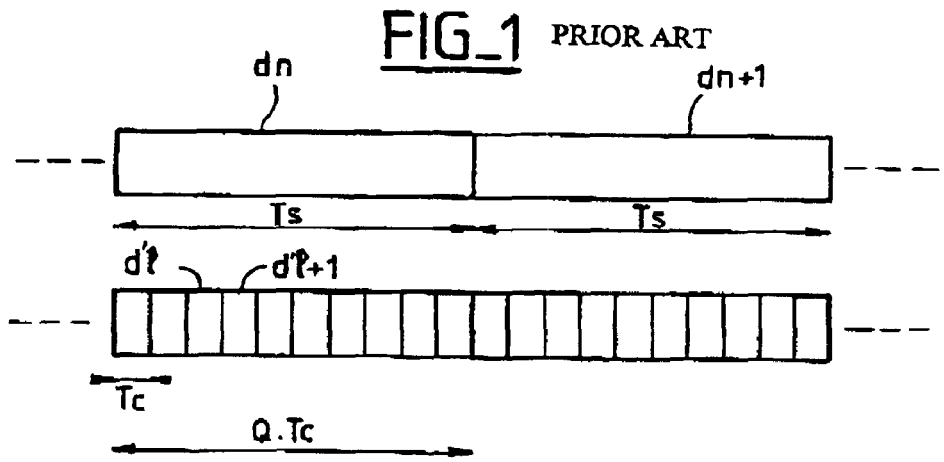
FIG_1 PRIOR ART
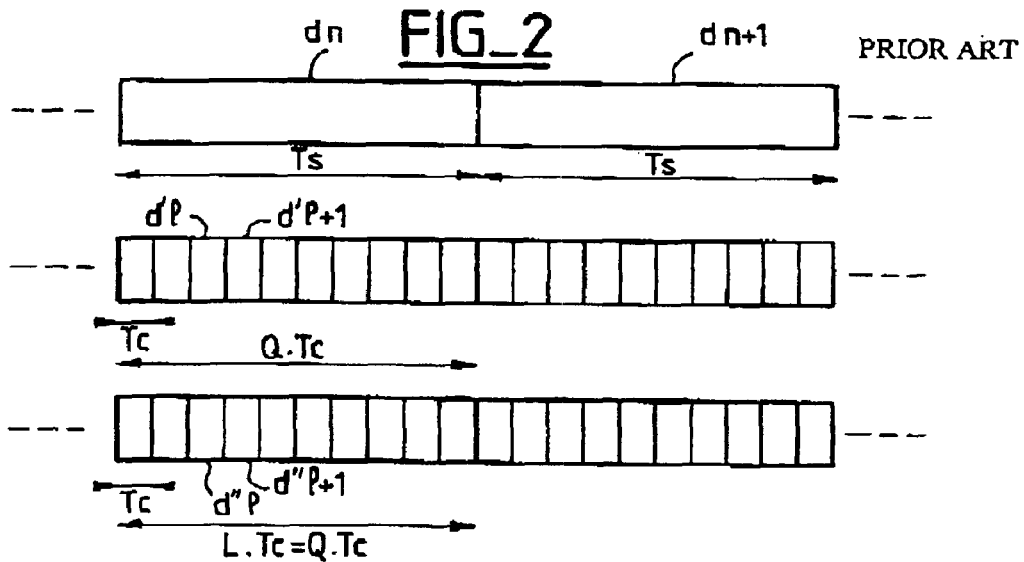
FIG_2 PRIOR ART
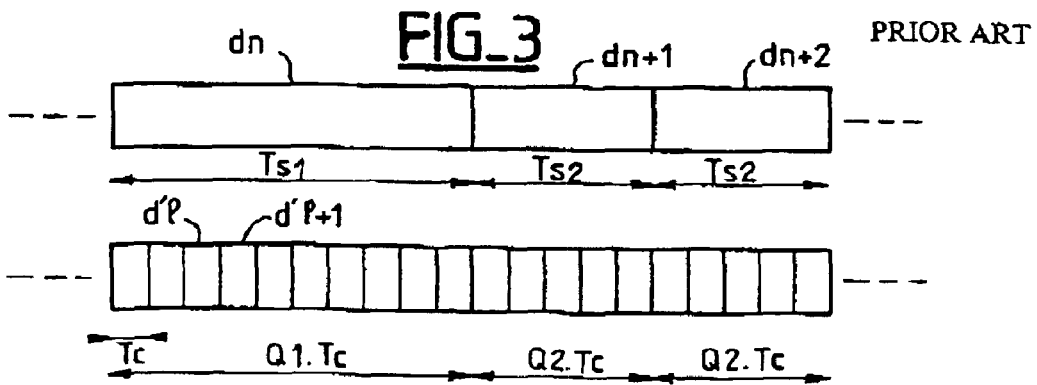
FIG_3 PRIOR ART

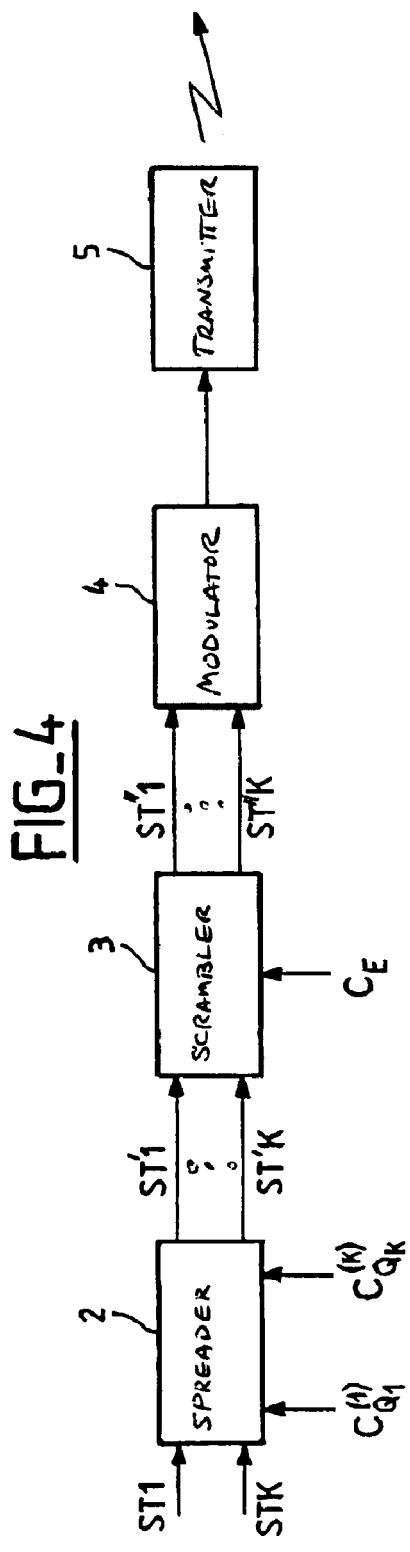
FIG_4
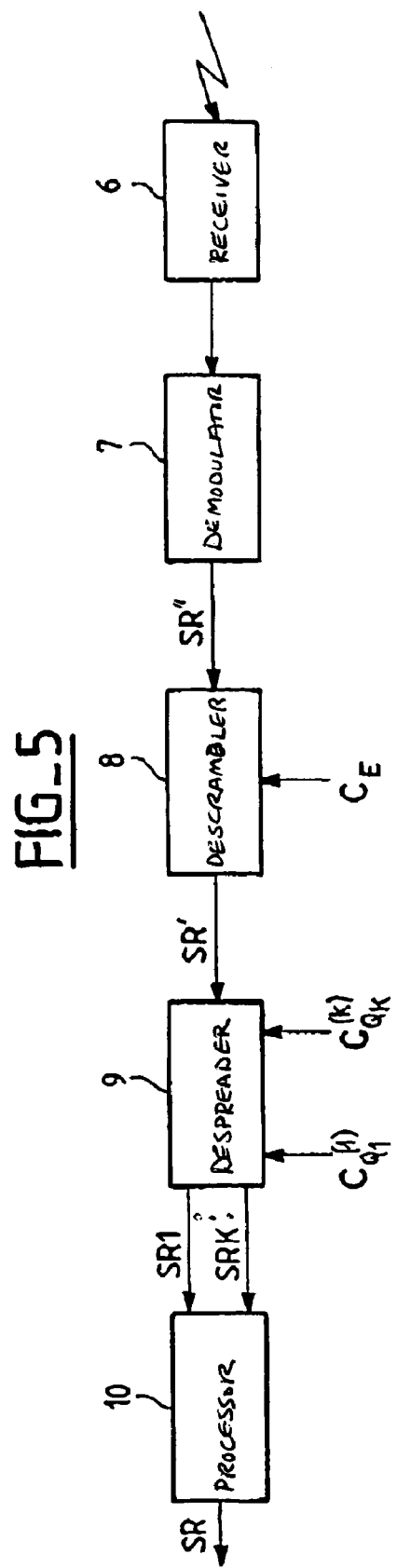
FIG_5

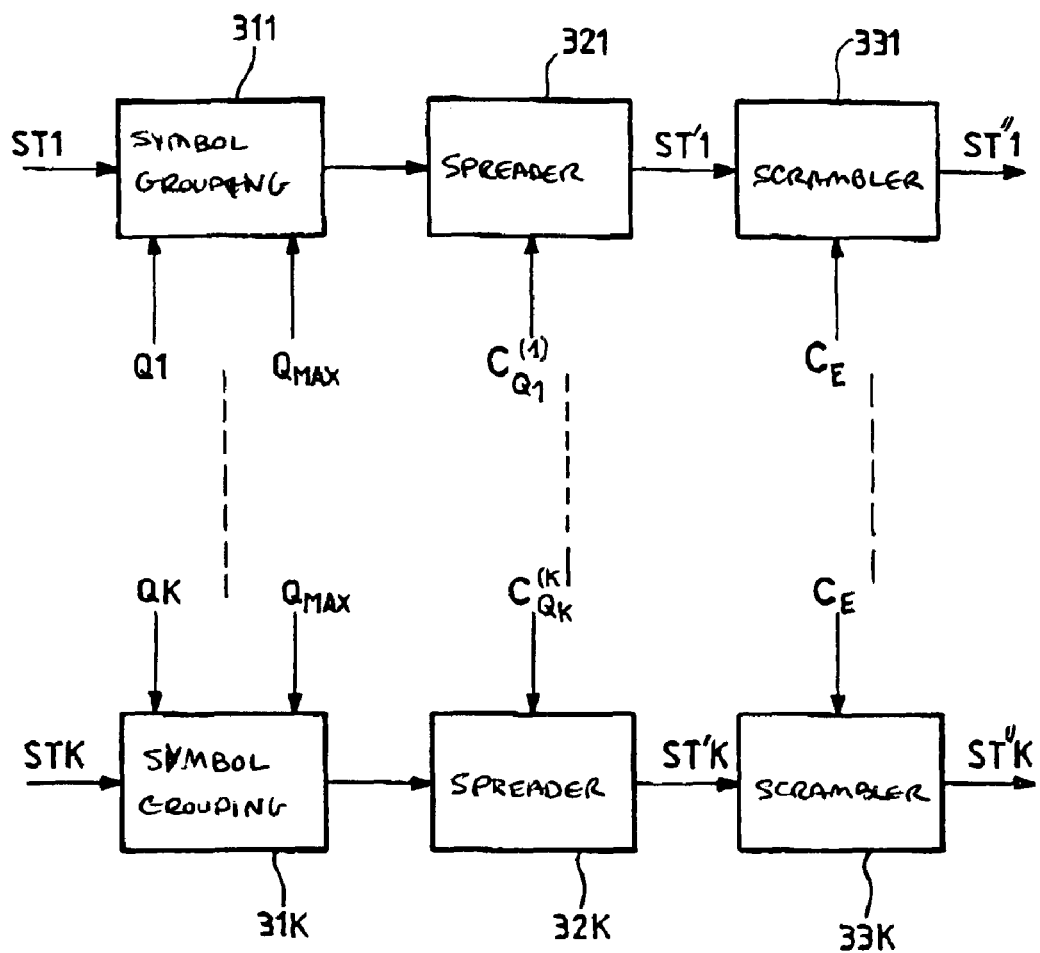

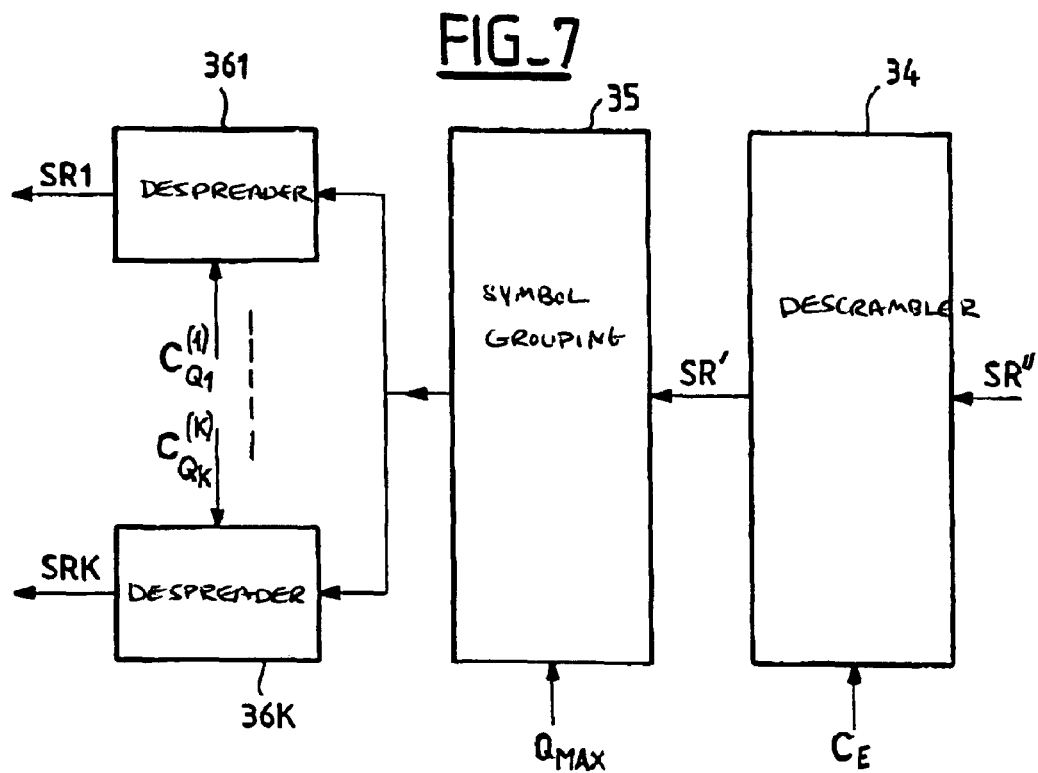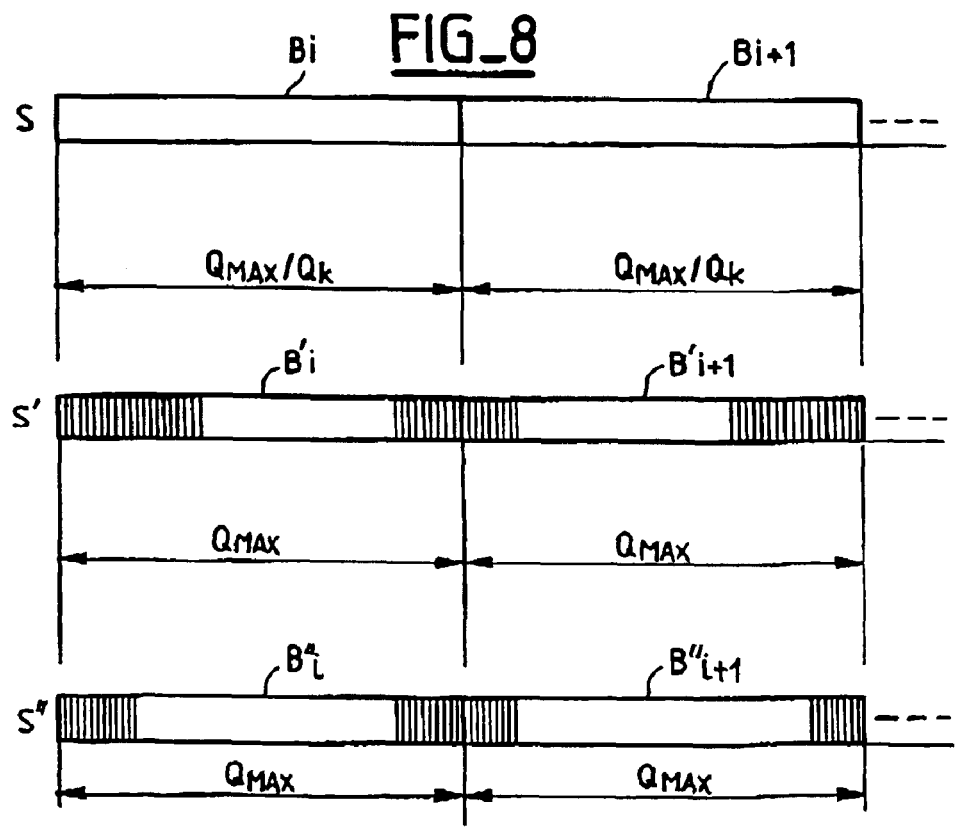

DEVICE ENABLING DIFFERENT SPREADING FACTORS WHILE PRESERVING A COMMON RAMBLING CODE, IN PARTICULAR FOR TRANSMISSION IN A CODE DIVISION MULTIPLE ACCESS CELLULAR MOBILE RADIO SYSTEM

The present invention is generally concerned with spread spectrum communication systems, i.e. systems in which spectrum spreading is applied to a sequence of data to be transmitted, on transmission, using a spreading code, and, conversely, despreading is effected on reception, in order to find the original sequence.

BACKGROUND OF THE INVENTION

Spreading an incident data sequence of N symbols, denoted (d1, d2, . . . , dN), using a code of length (or spreading factor) Q, denoted $C_Q$=(c1, c2, . . . , cQ), produces a sequence of length Q.N, which can be represented as follows:

(d1.c1, d1.c2, . . . , d1.cQ, d2.c1, d2.c2, . . . , dN.cQ)

where d1.c1 represents the multiplication of d1 by c1.

An alternative representation of the spread sequence of length Q.N is (d1.$c_Q$, d2.$c_Q$, . . . dN.$c_Q$) where d1.$c_Q$ represents the product of the symbol d1 by the spreading code $c_Q$.

A more general approach to spreading consists in having a different spreading code for each symbol of the input sequence, in which case the resulting spread sequence can be expressed in the form: (d1.$c_Q^{(1)}$,d2.$c_Q^{(2)}$, . . . dN.$c_Q^{(N)}$), $C_Q^{(1)}$ being the spreading code associated with the symbol d1. All the spreading codes preferably have the same length Q so that the resulting spread sequence has the length Q.N.

FIG. 1 outlines the principle of spreading, Ts designating the basic period (or symbol period) of a non-spread sequence and Tc designating the basic period (or "chip" period) of a spread sequence, Ts and Tc being related by the equation Ts=Q.Tc. In the figure dn and dn+1 correspond to two successive symbols of a non-spread incoming sequence and d'1 and d'1+1 correspond to two successive basic symbols (or "chips") of the same spread symbol of the incoming sequence.

One benefit of the above systems is enabling a plurality of users to share the same frequency band by allocating different users different codes.

One important application is Code Division Multiple Access (CDMA) cellular mobile radio systems.

In these systems, a spread sequence is generally scrambled prior to transmission using a scrambling code (or sequence), for various reasons including in particular improved protection against interference, or to assure the confidentiality of the information transmitted.

The scrambling of an incoming sequence of L basic symbols or "chips", denoted (d'1, d'2, . . . , d'L), by a scrambling sequence of length L, denoted (v1,v2, . . . ,vL), produces a sequence of length L that can be represented as follows (d'1.v1,d'2.v2, . . . ,d'L.vL)

The scrambling sequence can be a very long, typically pseudo-random sequence. A sequence of this kind protects against interfering signals by rendering them random, at least over the duration of said scrambling sequence.

The scrambling sequence can also be a short sequence, typically of length L equal to the, length Q of the spreading code (or an integer multiple thereof), as shown in FIG. 2, which uses the same type of representation as FIG. 1, and in which d"1 and d"1+1 designate two successive basic symbols (or "chips") of the same spread and scrambled symbol of the incoming sequence. By allocating different scrambling sequences to cells re-using the same spreading codes, this in particular reduces interference between cells. One benefit of these short sequences is producing transmitted signals having a cyclostationarity whose period is proportional to L, enabling efficient use of certain classes of algorithms, as described hereinafter. A description of cyclostationarity can be found in the article "Exploitation of Spectral Redundancy in Cyclostationary Signals", IEEE Signal Processing Magazine, April 1991, pp. 14–36, for example.

Interference between users in the same cell can be reduced by using a decoding algorithm at the receiver enabling interfering signals to be identified as such and therefore rejected, in particular on the basis of the signals received and a knowledge of the codes of the various users. Examples of such decoding algorithms are so-called subtractive detection algorithms or joint-detection algorithms. If all the cyclostationary signals have the same short period, it is in particular possible to use algorithms exploiting their nature. Such algorithms are described, for example, in the article "Interference Rejection in Digital Wireless Communications", IEEE Signal Processing Magazine, May 1997, pp. 37–62.

There is a need in these cellular mobile radio systems to be able to transmit data at a varying bit rate, in particular when the bit rate of the user itself varies (for example in the case of transmitting multimedia type data), or because, depending on the conditions for propagation of radio signals, a higher or lower degree of redundancy has to be introduced into the data to be transmitted in order to obtain a higher or lower degree of protection against transmission errors.

To increase the bit rate of data to be transmitted by a user for the same allocated frequency band (i.e. for the same duration Tc), allocating the user a plurality of codes of length Qm if the capacity of a single code of length Qm is exceeded is known per se.

A technique of the above kind has the particular disadvantage of leading to some complexity of implementation.

Another technique known per se, which avoids the above disadvantage, is to reduce the length of the code allocated to the user so that the user continues to transmit on only one code in order to increase the bit rate of the data to be transmitted by that user for the same allocated frequency band (i.e. for the same duration Tc). FIG. 3 summarizes the principle of a technique of this kind, and uses the same type of representation as FIGS. 1 and 2, but for two different bit rates of the incoming sequence, respectively identified by suffixes 1 and 2, in this instance for three successive symbols dn, dn+1 and dn+2 of the incoming sequence, the symbol period corresponding to Ts1 for symbol dn and Ts2 for symbols dn+1 and dn+2, and the code length corresponding to Q1 for symbol dn and Q2 for symbols dn+1 and dn+2.

A problem then arises due to the fact that a cellular mobile radio system may need to manage a plurality of users simultaneously whose instantaneous bit rates, and therefore whose spreading codes, are different and can separately take different values over time. The problem is that some algorithms, in particular decoding algorithms and especially the decoding algorithms referred to above, cannot, without modification, accept codes of different length for different users (whether at the same time or at different times). The cycloatationary nature of the sum of all the signals may have completely disappeared, for example, or it may have become too large to be useful.

OBJECTS AND SUMMARY OF THE INVENTION

A particular aim of the present invention is to provide a solution to this problem, in particular avoiding the need to modify these algorithms to enable them to accept combinations of codes of different lengths.

In one aspect the present invention therefore consists in a device enabling different spreading factors whilst preserving a common scrambling code, in particular for-transmission in a code division multiple access cellular mobile radio system, the device including, on transmission, scrambling means for applying a scrambling code of length $Q_{MAX}$ which is a multiple of said different spreading factors, to blocks of $Q_{MAX}$ basic symbols obtained by spreading by means of any of said spreading factors.

Accordingly each of the spread and scrambled sequences obtained in this way has a cyclostationarity of period proportional to $Q_{MAX}$, enabling efficient use of the interference rejection algorithms referred to hereinabove and consequently avoiding the disadvantages previously mentioned.

In another aspect the present invention also consists in a device enabling different spreading factors whilst preserving a common scrambling code, in particular for transmission in a code division multiple access cellular mobile radio system, the device including, on transmission, for spreading K incoming sequences by means of K respective spreading codes of respective length Qk (k=1, ..., K) which is a sub-multiple of a maximum length $Q_{MAX}$, and scrambling the spread sequences obtained in this way:

means for grouping the various data symbols of the kth incoming sequence (k=1, ..., K) into different blocks of $Q_{MAX}/Q_k$ symbols means for spreading the different blocks from the kth incoming sequence (k=1, ..., K) by means of the corresponding code of length $Q_k$ to obtain a spread sequence including different spread blocks of length $Q_{MAX}$ means for scrambling each of the K spread sequences obtained in this way using a scrambling code of length $Q_{MAX}$.

In another aspect the present invention also consists in a device enabling different spreading factors whilst preserving a common scrambling code, in particular for transmission in a code division multiple access cellular mobile radio system, the device including, on reception, descrambling means for applying a scrambling code of length $Q_{MAX}$ which is a multiple of said different spreading factors, to blocks of $Q_{MAX}$ basic symbols obtained by spreading by means of any of said spreading factors.

In another aspect the present invention also consists in a device enabling different spreading factors whilst preserving a common scrambling code, in particular for transmission in a code division multiple access cellular mobile radio system, the device including, on reception, for descrambling and despreading an incoming sequence by means of K respective spreading codes of respective length $Q_k$ (k=1, ..., K) which is a sub-multiple of a maximum length $Q_{MAX}$:

means for descrambling said incoming sequence using a scrambling code of length $Q_{MAX}$, means for grouping the basic symbols of the spread and descrambled sequence obtained in this way in different spread blocks of length $Q_{MAX}$, means for despreading the spread blocks obtained in this way by means of K respective codes to obtain K despread sequences formed of different blocks of $Q_{MAX}/Q_k$ symbols (k=1, ... K).

The present invention also has for its object a mobile station (or mobile terminal), as well as an entity, in particular base transceiver station, for a mobile radiocommunication system, including a device of the above kind.

BRIEF DESCRIPTION OF THE DRAWINGS

Other objects and features of the present invention will become apparent on reading the following description of one embodiment given with reference to the accompanying drawings, in which:

FIG. 1 is a diagram showing spectrum spreading of an incoming sequence,

FIG. 2 is a diagram showing spectrum spreading and scrambling of an incoming sequence, FIG. 3 is a diagram showing spectrum spreading in the case of a variable length spreading code, FIG. 4 is a block diagram of an example of a transmitter for a code division multiple access cellular mobile radio system to which the present invention can be applied, FIG. 5 is a block diagram of an example of a receiver for a code division multiple access cellular mobile radio system to which the present invention can be applied, FIG. 6 is a block diagram of an example of a device in accordance with the invention used on transmission, FIG. 7 is a block diagram of an example of a device in accordance with the invention used on reception, FIG. 8 is a diagram illustrating the operation of a device in accordance with the invention.

MORE DETAILED DESCRIPTION

The transmitter shown in FIG. 4 includes:

spreader unit 2 for spreading K incoming data sequences ST1 to STK using K respective spreading codes $c_{Q_1}^{(1)}$ to $c_{Q_K}^{(K)}$, scrambler unit 3 for scrambling K data sequences ST'1 to ST'K from the spreader unit 2 using a scrambling code $c_E$, modulator unit 4 receiving the various sequences ST"1 to ST"K from the scrambler unit 3, transmitter unit 5 receiving the modulated signals from the unit 4 and supplying the corresponding radio signals.

modulator means 4 receiving the various sequences ST"1 to ST"K from the means 3, transmitter means 5 receiving the modulated signals from the means 4 and supplying the corresponding radio signals.

The receiver shown in FIG. 5 includes:

receiver unit 6, demodulator unit 7, descrambler unit 8 for descrambling a data sequence SR" from the demodulator unit 7 using said scrambling code $c_E$, despreader unit 9 for despreading a data sequence SR' from the descrambler unit 8 using K respective spreading codes $c_{Q_1}^{(1)}$ to $c_{Q_K}^{(K)}$, and supplying K despread sequences SR1 to SRK to be used in processor unit 10 by a decoding algorithm of the type mentioned above to supply a received data sequence SR.

The device in accordance with the invention, used on transmission, can be used in the spreading unit 2 and the scrambling unit 3 from FIG. 4. In this case the device in accordance with the invention can be used in a base transceiver station for spreading incoming data sequences corresponding to different users served by the base transceiver station; it can also be used in a mobile terminal, by allocating different spreading codes to the user.

The device in accordance with the invention used on transmission shown in FIG. 6 includes:

grouping units 311 to 31K for grouping the data symbols of the kth incoming sequence (k=1, ... K) into different blocks of $Q_{MAX}/Q_k$ symbols ($d_1^{(k)}, d_2^{(k)}, \ldots, d_{Q_{MAX}/Q_k}$), spreader units 321 to 32K for spreading the blocks obtained in this way from the kth incoming sequence (k=1, ... K) using the corresponding code $c_{Q_k}^{(K)}$ to obtain a spread sequence including spread blocks of length $Q_{MAX}$ ($d_1^k \cdot c_{Q_k}^{(k)}, d_2^{(k)} \cdot c_{Q_k}^{(k)}, \ldots, d_{q_{MAX}/Q_k} \cdot c_{Q_k}^{(k)}$), grouping units 331 to 33K for scrambling each of the K sequences ST'1 to ST'K obtained in this way using a scrambling code $c_E$ of length $Q_{MAX}$.

The means such as the grouping units 311 to 31K are controlled in accordance with the maximal length $Q_{MAX}$ and the corresponding code lengths $Q_1$ to $Q_k$. If the length $Q_k$ of at least one of these codes is variable, in particular in accordance with the bit rate of the corresponding incoming sequence, these means enable the number $Q_{MAX}/Q_k$ of symbols per block to be varied, for the corresponding sequence, so that the product of this number by the length of this code remains constant and equal to $Q_{MAX}$.

The device in accordance with the invention is used in particular in the descrambling unit 8 and the despreading unit 9 from FIG. 5. In this case of application to despreading, the device in accordance with the invention can be used in a base transceiver station or in a mobile terminal to despread an incoming data sequence, not only by means of the spreading code allocated to a given user (or by means of one of the codes allocated to that user if they are allocated more than code), but also by means of the codes allocated to other users (and possibly other codes allocated to the user in question), in order to use a decoding algorithm such as those mentioned hereinabove.

The despreading device shown in FIG. 7 includes:

descrambler unit 34 for descrambling the incoming sequence SR" using a scrambling code $c_E$ of length $Q_{MAX}$, grouping unit 35 for grouping the data symbols of the descrambled sequence SR' obtained in this way into different spread blocks of length $Q_{MAX}$, means such as the despreader units 361 to 36K for despreading the spread blocks obtained in this way by means of respective codes such as the codes $c_{Q_1}^{(1)}$ to $c_{Q_K}^{(K)}$ to obtain K despread sequences SR1 to SRK formed of different blocks of $Q_{MAX}/Q_K$ symbols (k=1, ... K).

As indicated above, this avoids the need to modify the decoding algorithm to have it accept combinations of codes of different length.

Implementing the various means constituting the block diagrams of FIGS. 6 and 7 will not represent any particular problem to the skilled person, so such means need not be described here in more detail than by reference to their function.

Note that these diagrams are theoretical diagrams but clearly in practice the structure can be different, in particular the various component parts of the diagrams can be grouped together in common signal processor means.

The operation of a spreading or despreading device in accordance with the invention is shown in FIG. 8, where S corresponds to a non-spread and non-scrambled sequence, S' corresponds to a spread and non-scrambled sequence, and S" corresponds to a spread and scrambled sequence.

The figure shows, by way of example:

two successive blocks Bi and Bi+1 of length $Q_{MAX}/Q_k$ data symbols from the sequence S, two successive spread blocks B'i and B'i+1 of length $Q_{MAX}$ of the spread sequence S', two successive spread blocks B'i and B"i+1 of length $Q_{MAX}$ of the spread and scrambled sequence S".

Note also that what has been described can be varied in diverse ways; in particular, for improved efficiency, the spreading code can be different for the various symbols of a data sequence to which it applies.

What is claimed is:

1. A transmission device enabling different spreading factors while preserving a common scrambling code for transmission in a code division multiple access cellular mobile radio system, the device comprising:

spreading means for spreading blocks of symbols with the different spreading factors; and scrambling means for applying a scrambling code of length $Q_{MAX}$ which is a multiple of said different spreading factors, to blocks of $Q_{MAX}$ basic symbols obtained by spreading with any of said spreading factors.

2. A transmission device enabling different spreading factors while preserving a common scrambling code for transmission in a code division multiple access cellular mobile radio system, the transmission device spreading K incoming sequences by means of K respective spreading codes of respective length $Q_k$ (k=1, ... , K) which is a sub-multiple of a maximum length $Q_{MAX}$, and scrambling the spread sequences obtained in this way, the transmission device comprising:

grouping means for grouping data symbols of a kth incoming sequence (k=1, ... , K) into different blocks of $Q_{MAX}/Q_k$ symbols; and spreading means for spreading the different blocks from the kth incoming sequence (k=1, ... , K) by means of the corresponding spreading code of length $Q_k$ to obtain a spread sequence including different spread blocks of length $Q_{MAX}$, scrambling means for scrambling each of the K spread sequences generated by the spreading means by applying a scrambling code of length $Q_{MAX}$ which is a multiple of the spreading codes.

3. A reception device enabling different spreading factors while preserving a common scrambling code for transmission in a code division multiple access cellular mobile radio system, the device comprising:

descrambling means for applying a scrambling code of length $Q_{MAX}$ which is a multiple of said different spreading factors, to spread blocks of $Q_{MAX}$ basic symbols obtained by spreading with any of said spreading factors; and despreading means for despreading with said spreading factors said blocks of $Q_{MAX}$ basic symbols descrambled by said descrambling means.

4. A reception device enabling different spreading factors while preserving a common scrambling code for transmis sion in a code division multiple access cellular mobile radio system, the reception device descrambling and despreading an incoming sequence by means of K respective spreading codes of respective length $Q_k$ (k=1, . . . , K) which is a sub-multiple of a maximum length $Q_{MAX}$ the reception device comprising:

descrambling means for descrambling said incoming sequence of spread blocks of $Q_{MAX}$ basic symbols obtained by spreading with the spreading codes using a scrambling code of length $Q_{MAX}$ which is a multiple of the spreading codes;

grouping means for grouping basic symbols of the spread and descrambled sequence in different spread blocks of length $Q_{MAX}$; and despreader means for despreading the spread blocks with the K respective spreading codes to obtain K despread sequences formed of different blocks of $Q_{MAX}/Q_K$ symbols (k=1, . . . K).

5. A mobile station for a mobile radiocommunication system, comprising a device according to claim 1.

6. A base transceiver station for a mobile radiocommunication system, comprising a device according to claim 1.

7. A mobile station for a mobile radiocommunication system, comprising a device according to claim 2.

8. A base transceiver station for a mobile radiocommunication system, comprising a device according to claim 2.

9. A mobile station for a mobile radiocommunication system, comprising a device according to claim 4.

10. A base transceiver station for a mobile radiocommunication system, comprising a device according to claim 4.

* * * * *